(12) United States Patent
Manolakis et al.

(10) Patent No.: US 11,901,935 B2
(45) Date of Patent: Feb. 13, 2024

(54) NETWORK DEVICE AND WIRELESS COMMUNICATION DEVICE FOR CYCLIC COMMUNICATION

(71) Applicant: HUAWEI TECHNOLOGIES CO., LTD., Shenzhen (CN)

(72) Inventors: Konstantinos Manolakis, Munich (DE); Daniel Medina, Munich (DE); Mario Hernán Castañeda Garcia, Munich (DE); Richard Stirling-Gallacher, Munich (DE); Zhongfeng Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 46 days.

(21) Appl. No.: 17/238,761

(22) Filed: Apr. 23, 2021

(65) Prior Publication Data
US 2021/0242900 A1 Aug. 5, 2021

Related U.S. Application Data

(63) Continuation of application No. PCT/EP2018/079435, filed on Oct. 26, 2018.

(51) Int. Cl.
*H04B 1/7143* (2011.01)
*H04J 11/00* (2006.01)
(Continued)

(52) U.S. Cl.
CPC ........ *H04B 1/7143* (2013.01); *H04J 11/0033* (2013.01); *H04J 13/0074* (2013.01);
(Continued)

(58) Field of Classification Search
CPC .......... H04B 1/7143; H04B 2001/6904; H04B 2001/6908; H04B 2201/71323; H04J 11/0033; H04J 13/0074; H04J 11/003
See application file for complete search history.

(56) References Cited

U.S. PATENT DOCUMENTS 6,233,466 B1   5/2001   Wong et al.
6,298,081 B1  10/2001   Almgren et al.
(Continued)

OTHER PUBLICATIONS

Panasonic, On NR URLLC L1 enhancements. 3GPP TSG RAN WG1 Meeting #94bis, Chengdu, China, Oct. 8, 2018, R1-1810474, 9 pages.
(Continued)

*Primary Examiner* — Jae Y Lee
(74) *Attorney, Agent, or Firm* — Rimon PC

(57) ABSTRACT

The present application relates to wireless communications suitable for smart manufacturing and industrial automation. In particular, the application proposes a wireless communication device (UE) and a network device (BS), in particular suitable for cyclic communication. The BS is configured to provide a first information defining a hopping sequence to a UE, and to provide a second information to the UE defining when the hopping sequence should be repeated, in particular periodically repeated. The UE is accordingly configured to receive the first information from the BS, and to receive the second information from the BS. The hopping sequence specifies at least two spatial resources and/or at least two radio resources, which the UE is configured to use for transmissions to and/or from the BS.

12 Claims, 16 Drawing Sheets

(51) Int. Cl.
*H04J 13/00* (2011.01)
*H04B 1/69* (2011.01)

(52) U.S. Cl.
CPC ............... *H04B 2001/6904* (2013.01); *H04B 2001/6908* (2013.01); *H04B 2201/71323* (2013.01)

(56) References Cited

U.S. PATENT DOCUMENTS

| | | | |
|---|---|---|---|
| 7,016,649 | B1 | 3/2006 | Narasimhan et al. |
| 7,366,223 | B1 | 4/2008 | Chen et al. |
| 8,175,542 | B2 | 5/2012 | Nandagopalan et al. |
| 2010/0046583 | A1 | 2/2010 | So et al. |
| 2010/0284484 | A1 | 11/2010 | Ngren et al. |
| 2016/0065294 | A1 | 3/2016 | Kang et al. |
| 2016/0366577 | A1* | 12/2016 | Hu ........................ H04W 8/005 |
| 2017/0105214 | A1* | 4/2017 | Russo ................... H04W 76/10 |
| 2017/0202028 | A1* | 7/2017 | Gaal ....................... H04B 1/713 |
| 2017/0223695 | A1* | 8/2017 | Kwak ................... H04L 1/1671 |
| 2018/0034612 | A1* | 2/2018 | Lin ...................... H04L 25/0224 |
| 2018/0139727 | A1* | 5/2018 | Bayesteh ............. H04B 7/0689 |
| 2018/0176945 | A1* | 6/2018 | Cao ........................ H04L 5/0044 |
| 2018/0219649 | A1* | 8/2018 | Ying ...................... H04W 76/27 |
| 2018/0288746 | A1* | 10/2018 | Zhang ................... H04W 76/27 |
| 2018/0295651 | A1* | 10/2018 | Cao ................... H04W 74/0833 |
| 2018/0352568 | A1* | 12/2018 | Kim ....................... H04L 5/0053 |
| 2019/0053211 | A1* | 2/2019 | Ying ................... H04W 72/044 |

OTHER PUBLICATIONS

Hu Honglin et al., Performance evaluation of beam hopping communications scheme. 14th IEEE Proceedings on Personal, Indoor and Mobile Radio Communications, 2003. PIMRC 2003., Sep. 7, 2003, 5 pages.

Honglin Hu et al., Performance Evaluation of Distributed-Antenna Communications Systems Using Beam-Hopping. Wireless Communications and Mobile Computing 5(1):45-56, Feb. 1, 2005, 12 pages.

Geoffrey W. K. Colman, Spatial Hopping in MIMO Systems for Impeded Signal Reception by Multi-Element Eavesdroppers. IEEE Wireless Communications Letters, vol. 2, No. 6, Dec. 1, 2013, 4 pages.

\* cited by examiner

| Time/Freq. | Cycle 1 | Cycle 2 | Cycle 3 | Cycle 4 | Cycle 1 | ... |
|---|---|---|---|---|---|---|
| Band 1 | B1 | B2 | B4 | B5 | B1 | ... |
| Band 2 | B2 | B3 | | B3 | B2 | ... |
| Band 3 | | B1 | B1 | B1 | | ... |
| Band 4 | B3 | B6 | B2 | B6 | B3 | ... |
| Band 5 | B4 | B5 | B4 | B2 | B4 | ... |

| Color mapping to users | | | | | |
|---|---|---|---|---|---|
| User 1 | User 2 | User 3 | User 4 | No user |

FIG. 3

NETWORK DEVICE AND WIRELESS COMMUNICATION DEVICE FOR CYCLIC COMMUNICATION

CROSS-REFERENCE TO RELATED APPLICATIONS

This application is a continuation of International Application No. PCT/EP2018/079435, filed on Oct. 26, 2018, the disclosure of which is hereby incorporated by reference in its entirety.

TECHNICAL FIELD

The present application relates to wireless communications suitable for smart manufacturing and industrial automation. In particular, the application proposes a wireless communication device and a network device, in particular suitable for cyclic communication. The network device is configured to provide information to the wireless communication device, the information regarding a sequence of resources to be used by the communication device for communicating with the network device, and further regarding when to repeat these resources particularly for cyclic communication.

BACKGROUND

Future wireless communication networks are envisioned to play a key role in the development of smart manufacturing and industrial automation. Wireless communication shall be used to control production and increase efficiency, enable the digitalization of factories, integrate Internet of Things (IoT) and Machine-to-Machine (M2M) communication into the industrial ecosystem, and modernize logistics and transportation.

The communication requirements for supporting such use cases are challenging, mainly going into the direction of ultra-reliable and low-latency communication (URLLC), e.g. for coordinated actions of manufacturing robots. In such scenarios, periodicity is a typical situation, in order to implement efficient cycles including phases of measurements, processing and wireless data communication. To this end, predefined transmission/reception patterns between controllers (PLC) and sensors/actuators are naturally calling for semi-persistent scheduling (SPS). As a general rule, in most of such applications it is typical that packet errors in consecutive cycles are not permitted.

In particular, indoor communication in the mm-Wave frequency bands is considered as a major technical component. Key characteristics are the implementation of beam-forming techniques, large available bandwidth, low/moderate mobility and channel dynamics, multi-path wave propagation and Non-Line-of-Sight (NLOS), and slow changes in the network topology.

FIG. 13 shows typical scenarios of industrial automation and their corresponding key parameters, as well as the requirements for the wireless network.

FIG. 14 shows an example of a production unit, which consists of an infrastructure point and several users, which are mounted on robotic arms controlled by the PLC.

FIG. 15 shows an example of industrial communication, which involves control loops with sensors/actuators and a controller, wherein latency puts constraints and limits on:
Feedback and control information exchange.
Closed-loop schemes requiring frequent signaling, e.g. channel measurement updating.
Packet retransmission, e.g. (Hybrid) Automatic Repeat Request ((H)ARQ).
Frame/symbol/code block time duration.

Radio-link latency<0.5*($T$cycle−ActProcTime−SensProcTime−CtrlProcTime).

At the same time, a reliability goal is to exclude with a very high probability non-permitted error behaviors, as e.g. data packet failures in consecutive cycles (see example in FIG. 16). This does not (necessarily) translate into an SINR/spectral efficiency maximization. The main goal is to guarantee a certain (e.g. minimum) SINR, based on which modulation and coding can be adjusted. Limited information exchange leads to more challenges. This is addressed by exploiting sources of diversity and/or multi-point transmission.

However, reliability requirements fail in case of a "QoS failure", which occurs when at least one of following takes place:
"Single beam failure": failure of at least one single beam within a determined period of time, e.g. a hopping period, e.g. if received power of the corresponding reference signals is below a certain threshold.
"Data decoding failure", e.g. if BLER is too high within the determined period of time.

The present application focuses on the above-described special and more challenging requirements of industrial automation, particularly compared to conventional wireless (cellular) communication. Compared with other 5G use cases that are met in the vertical industry, e.g. vehicular communication, the present use case of industrial automation comes with very unique requirements, particularly in latency and reliability. One example is the fact that consecutive errors are not permitted, so that production cycles are not interrupted.

In conventional wireless communication systems, there exist and are used some concepts of changing beams and some general concepts of frequency hopping. However, the conventional communication systems do not provide a solution for industrial communication scenarios. With the conventional wireless communication systems, it is difficult to meet the reliability requirements, particularly in terms of packet failures and especially avoiding consecutive failures. In order to meet these requirements with the conventional wireless communication systems, the cost in terms of resources or complexity overhead to ensure robust transmission would be very high.

SUMMARY

In view of the above-mentioned challenges of industrial automation, embodiments of the present application aim to improve the conventional wireless communication systems. An objective is to provide a wireless communications system, i.e. both a network device and a wireless communication device, better suitable for industrial communication scenarios. In particular, the aim is to meet reliability requirements in terms of packet failures. Consecutive failures should be avoided. Further, costs in terms of resources or complexity overhead should be held low.

Specific goals tackled by embodiments of the application are to:
Guarantee QoS by fulfilling a minimum SINR requirement.
Minimize delays by avoiding (H)ARQ and high signaling overhead.

Avoid time-consuming procedures as beam alignment in case of a single beam failure.

The objective and the goals are achieved by the embodiments provided in the enclosed independent claims. Advantageous implementations of the embodiments are further defined in the dependent claims.

In particular the present application proposes beamforming and time/frequency resource allocation, in order to achieve a reliable communication for SPS multi-point transmissions.

A first aspect of the application provides a network device (BS), in particular for cyclic communication, configured to: provide a first information defining a hopping sequence to a wireless communication device (UE), wherein the hopping sequence specifies at least two spatial resources and/or at least two radio resources to be used by the UE for transmissions to and/or from the BS; and provide a second information to the UE defining when the hopping sequence should be repeated, in particular periodically repeated.

By providing the two elements of information, the UE is instructed to use a dedicated sequence and repetition of the resources. This leads to higher reliability in terms of packet failures, and in particular consecutive failures are avoided. Thus, the device of the first aspect is suited well for the industrial automation scenario.

The provision of the two elements of information can be in a single or multiple messages, for example it can be comprised in a message with control information. Cyclic communication can be realized by a semi-persistent communication scheme and/or an SPS or another industrial control system.

A spatial resource may include a BS-beam and/or a UE-beam, beam pair, and/or a transmission- and/or reception point (TRP) and/or a radio resource may include a time-domain, and/or frequency-domain, and/or code-domain radio resource.

In an implementation form of the first aspect, the network device is configured to: provide the first information defining a hopping pattern to multiple UEs, wherein the hopping pattern comprises different hopping sequences, one hopping sequence for each of the multiple UEs.

Thus, the multiple UEs are instructed to use the resources in a dedicated sequence among each other. The hopping pattern leads to higher reliability in terms of packet failures, and in particular consecutive failures are avoided.

In an implementation form of the first aspect, the network device is configured to: calculate at least one hopping sequence.

In an implementation form of the first aspect, the network device is configured to: obtain a measurement, in particular a signal strength and/or a signal-to-interference-plus-noise ratio (SINR) from at least one UE, TRP, and/or another BS, and calculate the at least one hopping sequence on the basis of the received at least one measurement.

By using the measurements to generate the hopping pattern, reliability can be further improved.

In an implementation form of the first aspect, the second information specifies a period of time and/or a number of successive transmissions, for which the at least two spatial resources and/or the at least two radio resources are to be successively used by the UE.

In an implementation form of the first aspect, the network device is configured to: obtain feedback information about a communication failure from the UE, and provide a third information about an updated hopping sequence, updated based on the received feedback information, to the UE.

The updated hopping sequence may specify at least two spatial resources and/or radio resources to be successively used by the wireless communication device, as of receiving the updated hopping sequence, for successive transmissions to and/or from the network device. A communication failure can be a missed packet and/or based on a QoS failure (QoS failure as defined above).

By providing the updated hopping sequence, the communication failure can be addressed and accordingly reliability is improved.

In an implementation form of the first aspect, the second information further specifies a spatial resource and/or radio resource to be used by the UE to provide the feedback information to the BS, and the network device is configured to obtain the feedback information from the UE according to the spatial resource and/or radio resource specified by the second information.

Thus, also the feedback of one or more UEs to the network device is reliable.

In an implementation form of the first aspect, the second information further includes a maximum number of communication failures, in particular related to missing packets and/or QoS-failures, for which the hopping sequence is valid and/or a spatial and/or radio resource for providing feedback information.

In an implementation form of the first aspect, the network device is configured to: provide a fourth information related to the first information and/or the second information defining a backup hopping sequence to be used by the UE, as of occurrence of a communication failure, for transmissions to and/or from the BS.

Thus, the communication failure can be addressed quickly and efficiently, which avoids interruption of e.g. an industrial automation process.

A second aspect of the application provides a wireless communication device (UE) configured to: receive a first information defining a hopping sequence from a BS, wherein the hopping sequence specifies at least two spatial resources and/or at least two radio resources, and receive a second information from the BS defining when the hopping sequence should be repeated, in particular periodically repeated, and use the at least two spatial resources and/or at least two radio resources for transmissions to and/or from the BS according to the second information.

By receiving the two elements of information, the UE can implement the sequence of using the resources such that its communication with the network device becomes more reliable, particularly in terms of packet failures. Thus, the device of the second aspect is well suited for industrial automation scenarios.

In an implementation form of the second aspect, the wireless communication device is configured to: use the at least two spatial resources and/or at least two radio resources specified by the hopping sequence for transmissions of a first transmission cycle, and again for transmissions of at least one second transmission cycle.

Thus, cyclic communication with high reliability can be implemented, which is well suited for industrial automation scenarios.

In an implementation form of the second aspect, a spatial resource includes a UE-beam and/or a BS-beam, and/or a TRP, and/or a radio resource includes a time-domain, and/or frequency-domain, and/or code-domain radio resource.

By providing diversity, the communication between network device and wireless communication device is made highly reliable.

In an implementation form of the second aspect, the wireless communication device is configured to: obtain, particularly upon a request from the BS, a measurement, particularly a SINR in one or more radio resources while using a certain spatial resource, and transmit the measurement to the BS.

In an implementation form of the second aspect, the wireless communication device is configured to: transmit feedback information about a communication failure to the BS, receive a third information about an updated hopping sequence from the BS.

The updated hooping sequence may specify at least two spatial resources and/or radio resource, and the wireless communication device may use, as of receiving the updated hopping sequence, the at least two spatial resources and/or radio resources specified by the updated hopping sequence for transmissions to and/or from the BS.

In an implementation form of the second aspect, the second information specifies a further spatial resource and/or radio resource to be used by the UE to provide the feedback information to the BS, and the UE is configured to: transmit the feedback information to the BS in said further spatial resource and/or radio resource specified by the second information.

A third aspect of the application provides a method for a network device (BS), the method comprising: providing a first information about a hopping sequence to a wireless communication device (UE), wherein the hopping sequence specifies at least two spatial resources and/or at least two radio resources to be used by the UE for transmissions to and/or from the BS, and providing a second information to the UE defining when the hopping sequence should be repeated, in particular, periodically repeated.

In an implementation form of the third aspect, the method comprises: providing the first information defining a hopping pattern to multiple UEs, wherein the hopping pattern comprises different hopping sequences, one hopping sequence for each of the multiple UEs.

In an implementation form of the third aspect, the method comprises: calculating at least one hopping sequence.

In an implementation form of the third aspect, the method comprises: obtaining a measurement, in particular a signal strength and/or a SINR from at least one UE, TRP, and/or another BS, and calculating the at least one hopping sequence on the basis of the received at least one measurement.

In an implementation form of the third aspect, the second information specifies a period of time and/or a number of successive transmissions, for which the at least two spatial resources and/or the at least two radio resources are to be successively used by the UE.

In an implementation form of the third aspect, the method comprises: obtaining feedback information about a communication failure from the UE, and providing a third information about an updated hopping sequence, updated based on the received feedback information, to the UE.

In an implementation form of the third aspect, the second information further specifies a spatial resource and/or radio resource to be used by the UE to provide the feedback information to the BS, and the method comprises: obtaining the feedback information from the UE according to the spatial resource and/or radio resource specified by the second information.

In an implementation form of the third aspect, the second information further includes a maximum number of communication failures, in particular related to missing packets and/or QoS-failures, for which the hopping sequence is valid and/or a spatial and/or radio resource for providing feedback information.

In an implementation form of the third aspect, the method comprises: providing a fourth information related to the first information and/or the second information defining a backup hopping sequence to be used by the UE, as of occurrence of a communication failure, for transmissions to and/or from the BS.

The method of the third aspect and its implementation forms achieve the same advantages and effects as the device of the first aspect and its respective implementation forms.

A fourth aspect of the application provides a method for a wireless communication device (UE), the method comprising: receiving a first information about a hopping sequence from a network device (BS), wherein the hopping sequence specifies at least two spatial resources and/or at least two radio resources, receiving a second information from the BS defining when the hopping sequence should be repeated, in particular periodically repeated, and using the at least two spatial resources and/or at least two radio resources for transmissions to and/or from the BS according to the second information.

In an implementation form of the fourth aspect, the method comprises: using the at least two spatial resources and/or at least two radio resources specified by the hopping sequence for transmissions of a first transmission cycle, and again for transmissions of at least one second transmission cycle.

In an implementation form of the fourth aspect, a spatial resource includes a UE-beam and/or a BS-beam, and/or a TRP, and/or a radio resource includes a time-domain, and/or frequency-domain, and/or code-domain radio resource.

In an implementation form of the fourth aspect, the method comprises: obtaining, particularly upon a request from the BS, a measurement, particularly a SINR in one or more radio resources while using a certain spatial resource, and transmit the measurement to the BS.

In an implementation form of the fourth aspect, the method comprises: transmitting feedback information about a communication failure to the BS, receive a third information about an updated hopping sequence from the BS.

In an implementation form of the fourth aspect, the second information specifies a further spatial resource and/or radio resource to be used to provide the feedback information to the BS, and the method comprises: transmitting the feedback information to the BS in said further spatial resource and/or radio resource specified by the second information.

The method of the fourth aspect and its implementation forms achieve the same advantages and effects as the device of the first aspect and its respective implementation forms.

To summarize, the above aspects and implementation forms achieve improved reliability through applying diversity, which in general is obtained in time, frequency, space (beam) and/or multiple transmit/receive points, i.e. multiple radio links. A certain (minimum) SINR can be guaranteed, in order to avoid packet errors, rather than maximizing the SINR or data throughput. Multi-point diversity is particularly helpful against link blockage in industrial environments using mm-Wave communication, and where a large number of connected infrastructure nodes are used.

In every time transmission, e.g. cycle/frame, each UE can for example be served by one or more transmit receive points (TRPs), and further from each TRP by a predefined beam (Tx-Rx beam pair) and/or on a predefined frequency band and time slot/symbol within the cycle/frame. In the same cycle/frame, other frequency bands, time slots/symbols and/or beams may be used, in order to serve other UEs from the same or another TRP.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present application will be explained in the following description of specific embodiments in relation to the enclosed drawings, in which

FIG. 3 shows an example of a spatial-frequency hopping pattern that can be implemented by devices according to embodiments of the application.

DETAILED DESCRIPTION OF EMBODIMENTS

Figure 1:
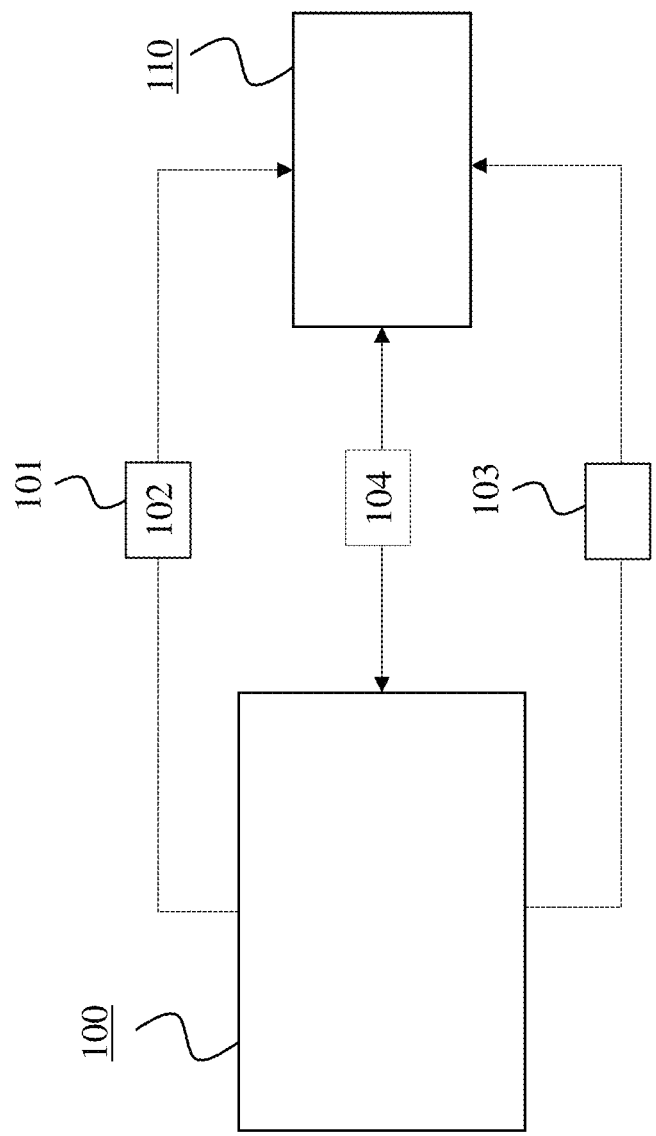
FIG. 1 shows a network device and a wireless communication device according to embodiments of the application.

FIG. 1 shows a network device 100, particularly a Base Station (BS), like a gNodeB or infrastructure node, and a wireless communication device 110, particularly User Equipment (UE), according to embodiments of the application. In particular, the devices 100 and 110 are configured for performing cyclic communication, i.e. a communication that is cyclically repeated. The devices 100 and 110 are particularly well suited for industrial automation scenarios.

The BS is configured to provide a first information 101 defining a hopping sequence 102 to the UE 110. The first information 101 may include the hopping sequence 102 or may allow the UE 110 to derive the hopping sequence 102. Accordingly, the UE 110 is configured to obtain and/or receive the first information 101 defining the hopping sequence 102 from the BS 100.

The BS 100 is further configured to provide a second information 103 to the UE 110 defining when the hopping sequence 102 should be repeated, in particular periodically repeated (i.e. my defined a "cycle"). Accordingly, the UE 110 is configured to obtain and/or receive the second information 103 from the BS 100, and may determine from the second information 103 when to repeat the hopping sequence 102.

The hopping sequence 102 specifies at least two spatial resources and/or at least two radio resources to be used by the UE 110 for transmissions 104 to and/or from the BS 100. In particular, the UE 110 is thus configured to use the at least two spatial resources and/or at least two radio resources determined by the hopping sequence 102 for its transmissions 104 to and/or from the BS 100, and according to the second information 103, e.g. when, how often, and for how long.

The network device 100 may in particular be configured to provide the first information 101 to multiple UEs 110. In this case, the first information 101 may define a hopping pattern, which comprises different hopping sequences 102, specifically one hopping sequence 102 per each of the multiple UEs 110. Each hopping sequence 102 in the hopping pattern specifies in this case at least two spatial resources and/or at least two radio resources for one of the UEs 110 to use for its transmissions 104.

The at least two spatial resources may generally include one or more BS-beams and/or one or more UE-beams, one or more beam pairs, and/or one or more TRPs. The at least two radio resource may include one or more time-domain, and/or one or more frequency-domain, and/or one or more code-domain radio resources. This holds for both hopping sequence 102 and hopping pattern.

Figure 2:
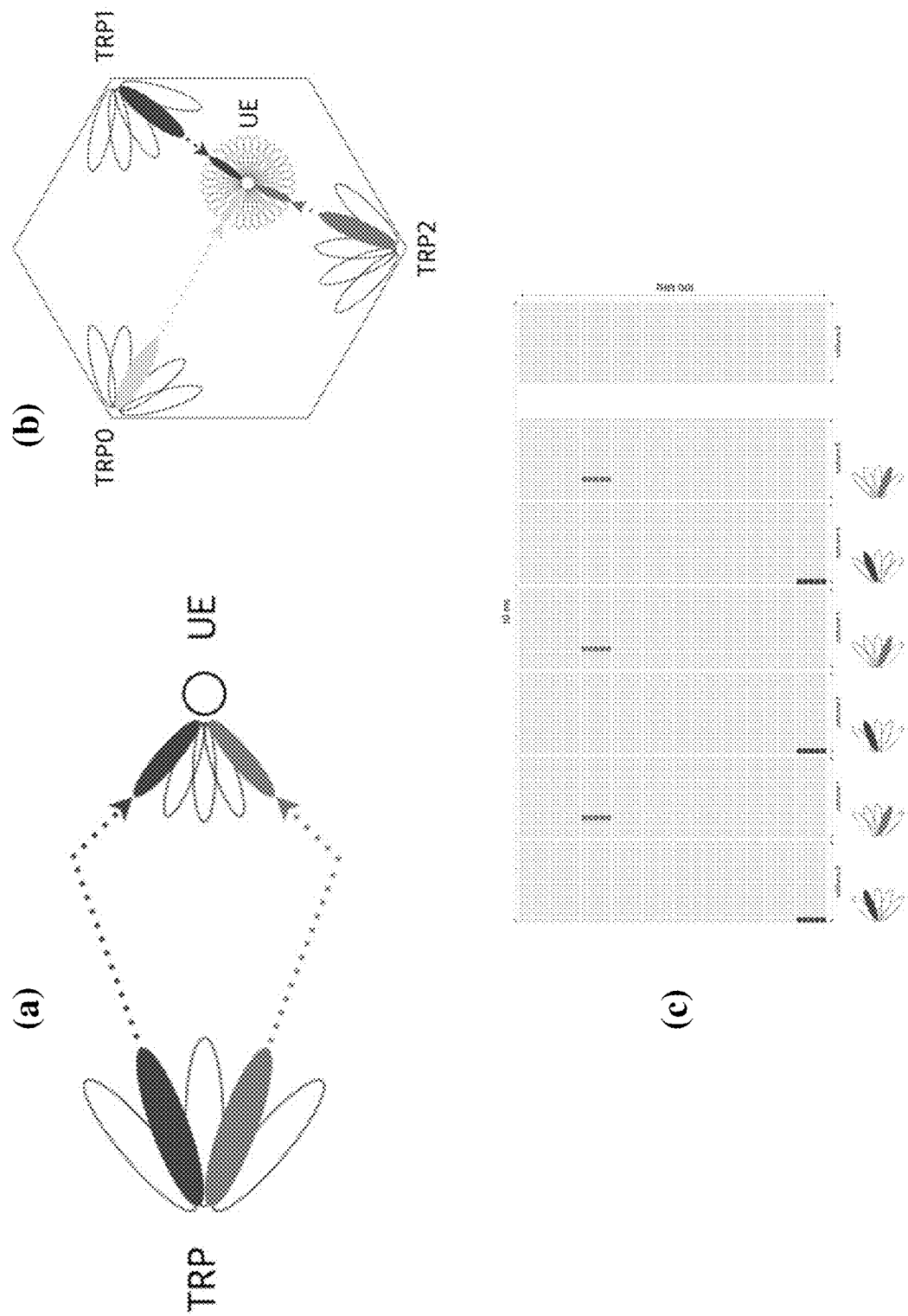
FIG. 2 shows examples of hopping schemes for different spatial and time/frequency resources that can be implemented by devices according to embodiments of the application.

In particular, for consecutive transmissions 104 to/from the BS 100, the hopping sequence 102 may specify one or preferably even more of the following hopping types (with reference to FIG. 2):

Frequency hopping (FH), e.g. as in FIG. 2(c): assign different frequency-domain resources, e.g. frequency band(s).

Time hopping (TH), e.g. as in FIG. 2(c): assign different time-domain resources, e.g. time slots/symbols within one cycle/frame duration.

Spatial hopping (SH), e.g. as in FIG. 2(a): use different BS-beams, UE-beams and/or beam pairs, e.g. form a preselected set of (Tx-Rx) beam pairs, change the serving beam(s).

Multi-point hopping (MPH), e.g. as in FIG. 2(b): serve the user from different TRP(s).

The benefits of these hopping types are:

FH protects from consecutive deep frequency selective fading events.

TH protects from consecutive high interference from nearby transmissions.

SH protects from consecutive beam blockage events.

MPH protects from all above (especially blockage), and increases diversity.

A joint spatial-frequency hopping type is particularly powerful against LOS blockage and frequency-selective fading, and "randomizes" the channel as observed between Tx and Rx in different transmissions 104. This increased diversity, for instance, reduces the probability of QoS failures in consecutive time slots, thus leading to an improved performance. Combinations of different hopping types in a hopping sequence 102 may include a selection of TRPs, Tx/Rx beam pairs and time/frequency resources, in order to guarantee a certain QoS (e.g. min SINR).

Notably, considering e.g. spatial hopping, beam pairs may typically be selected by beam alignment. However, especially in NLOS conditions, exhaustive beam alignment and tracking may only offer small gains, while being complex and potentially introducing large delays. Further, frequent updating may be needed, in order to ensure using the best beam pair, which may increase complexity and may introduce a time delay. For example, in case of a beam failure, a beam alignment may have to be performed, possibly affecting the data connection.

Thus, each UE 110 according to an embodiment of the application (as e.g. shown in FIG. 1) may preferably be scheduled and served in SPS way, in particular in different time intervals, by using different beam (pairs) and on different frequencies, which may be selected based on initial measurements. This provides the following benefits:

Higher diversity due to switching beams/frequencies: the probability of consecutive errors due to beam failure or frequency-selective fading is reduced.

Scheme gains robustness to link blockage, change of location changes and mobility Low signaling overhead due to the pre-selection and pre-instruction of the schedule.

No need for frequent updates and signaling in case of a single beam/link failure.

FIG. 3 depicts an example of a hopping pattern for 4 UEs 110 ("users"; distinguished by different shadings), the hopping pattern accordingly including 4 hopping sequences 102, one for each UE 110 according to an embodiment of the application. Further, the example includes 5 frequency bands (as frequency resources), six beam pairs (as spatial resources) and a 4-cycle periodicity. B1 to B6 are (pairs of Tx-Rx) beams, which are selected from a set of initial beam measurements performed between Tx and Rx. Assignment may be such that different beams and frequencies are used in consecutive cycles. This prevents failures in consecutive cycles for the same UE 110. The hopping pattern with the hopping sequences 102 is instructed by the BS 100 to each UE 110, and may then be used repeatedly unless it is updated by the BS 100, e.g. in case of insufficient SINR, beam failure or high packet losses. In this case, the BS 100 may be configured to provide a third information about an updated hopping sequence 102, updated based on the insufficient SINR, beam failure or high packet losses, to a UE 110 or an updated hopping pattern to the multiple UEs 110.

Figure 4:
FIG. 4 shows a comparison of a scheme without hopping and a hopping scheme implemented by devices according to embodiments of the application.

FIG. 4 clarifies the benefits of the devices 100 and 110 according to embodiments of the application, which use a hopping sequence 102 or hopping pattern (see FIG. 4(b)) when compared to a conventional scheme without such hopping (see FIG. 4(a)). As can be observed, in the conventional scheme the reliability may suffer due to consecutive errors, and at the same time, in case of beam failure, a new beam search needs to be activated. This will take two cycles for the new beam search to take place, which increases the overall delay. The scheme implemented by the devices 100 and 110 does not suffer from these disadvantages.

Figure 5:
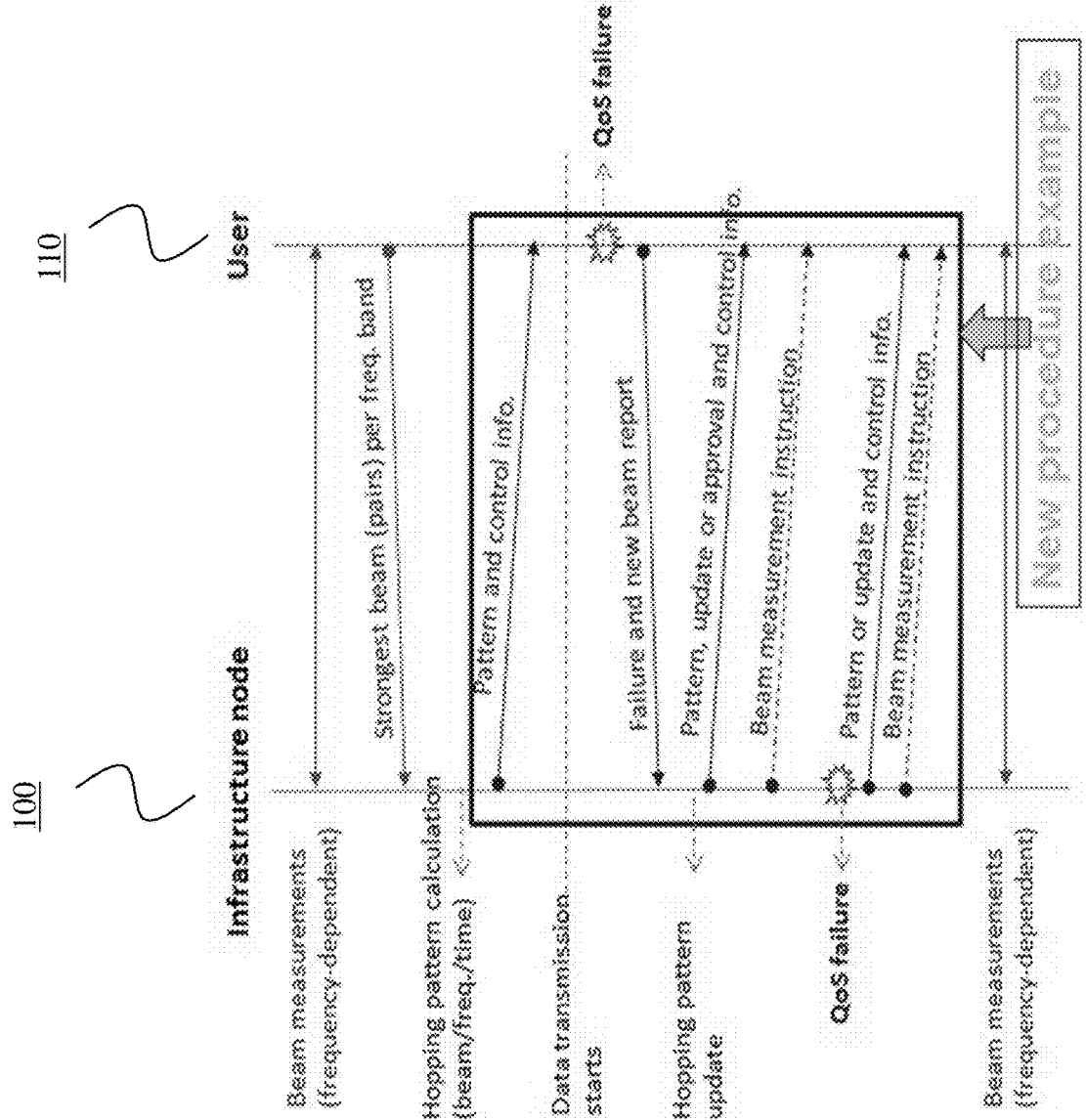
FIG. 5 shows a procedure between a network device (infrastructure node) and a wireless communication device (user) according to embodiments of the application.

FIG. 5 shows an example of steps of a procedure between the BS 100 ("infrastructure node") and a UE 110 ("user"). Here, the events of a QoS failure on both the BS side as well as on the UE side are included. The procedure between BS 100 and the UE(s) 110 may include:

Beam alignment may be performed based on frequency-dependent beam (pair) measurements.

The UE 110 may report a list of strongest beam pairs to the BS 100, and (optionally) corresponding quality indicators per frequency band.

Based on reporting (or previous knowledge) of the UE 100 or multiple UEs 110, the BS 100 may calculate the hopping sequence 102, particularly a beam/frequency/time sequence, for each UE 110.

The hopping sequences 102 may form a hopping pattern in case of more UEs 110, which is assigned (i.e. with the first information) by the BS 100 to each UE 110 together with control information (i.e. the second information).

The hopping sequence/pattern can include one or more of: a Tx beam, a Tx-Rx beam pair, a resource index, frequency and/or time resource information. Generally the hopping sequence/pattern specifies at least two spatial resources and/or at least two radio resources to be used by each UE 110 for transmissions 104 to and/or from the BS 100.

The control information may indicate the period and/or for how many transmissions 104 the hopping pattern/sequence is to be used. In particular, it may specify a period of time and/or a number of successive transmissions 104, for which the at least two spatial resources and/or the at least two radio resources are to be successively used by the one or more UEs 110.

Further, the control information may include feedback configuration information. That is, it may include information specifying a spatial resource and/or radio resource to be used by the UE 110 to provide the feedback information to the BS 100. It may also include a maximum number of communication failures, in particular related to missing packets and/or QoS-failures, for which the hopping pattern/sequence 102 is valid and/or a spatial and/or radio resource for providing feedback information.

Optionally, a second hopping sequence/pattern (or alternative beams for the same time/frequency resources) may be provided by the BS 100 to the UE(s) 110, to be used as backup hopping pattern in case of a communication failure, e.g. QoS failure.

Notably, the update rate in beam and frequency does not need to be the same. The granularity of the hopping sequence/patter in time can be such that not all time resources are assigned to a UE 110.

Hopping sequences/patterns can differ in downlink/uplink (DL/UL), e.g. if data traffic is non-symmetric.

In case of user-side QoS failure, a UE 110 may select a new beam and may report this to the BS 100.

The BS 100 may approves the new beam, or may assign an updated hopping sequence/pattern of or a full new hopping sequence/pattern to the UE 110.

Optionally, the BS 100 can initiate a beam measurement/alignment.

The feedback configuration information, which is included in the control information (i.e. the second information) may specifically include following information:

The beam(s) which the BS 100 will use for receiving the feedback information, e.g.
  a. The strongest beam (according to initial measurements' report), from the ones that have been assigned to the UE 110.
     i. If there is a failure on this assigned beam, the UE 110 may assume that the BS 100 listens on all UE assigned beams
  b. Whether to use another beam and specify this, or
     i. If there is a failure on this assigned beam, the UE 110 assumes that the BS 100 listens on all UE assigned beams
  c. Use all assigned beams in the pattern to the user.

In case of a QoS failure in downlink, the UE 110 behavior shall be to:
  a. Select anew downlink BS-beam, report failure and this beam to the BS or
  b. Inform the BS that the UE switches to the alternative pattern already provided by the BS (applicable when two patterns have been assigned)

The maximum number of QoS failures for the user within one pattern/feedback reporting time. This number determines the resources reserved for feedback.

The time/frequency resource where each user's feedback shall be transmitted.

Figure 6:
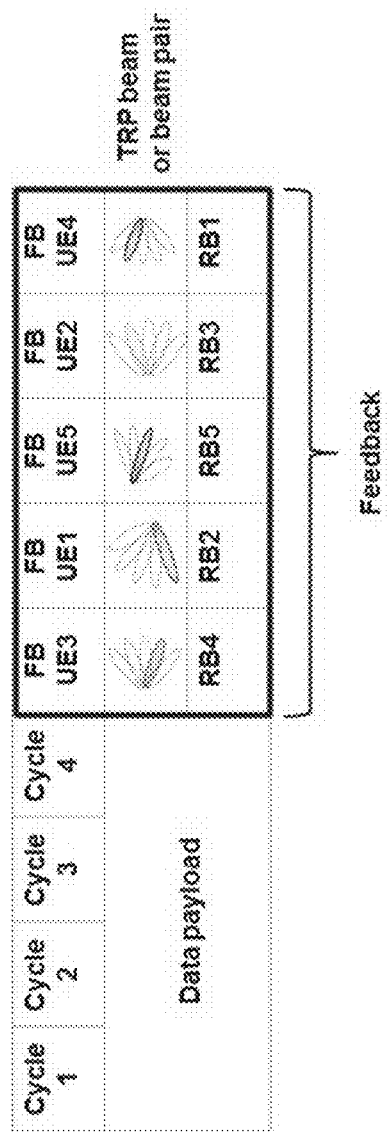
FIG. 6 shows an example of feedback reporting implemented by devices according to embodiments of the application.

FIG. 6 shows an example of 4 UEs 110, which report feedback in a predefined time and frequency resource (RB), each one by using the assigned beam. Different UEs' feedback can be multiplexed in time, frequency and/or beam.

It is noted that multiple UEs 110 served by a single BS 100 do not necessarily need to have the same hopping sequence 102 periodicity. However, it is required that the period of the longest cycle is a multiple of the other users' shorter periods. Control information is initially sent before the beginning of the first cycle for all users.

However, feedback information can be reported—if needed—by each UE 110 independently after its own frame, i.e. after its own cycle(s). This allows for sending additional control information to these particular UEs 110, e.g. immediately after their feedback information has been received by the BS 100, in order to be used for adjusting transmission 104 in the next frames.

Figure 7:
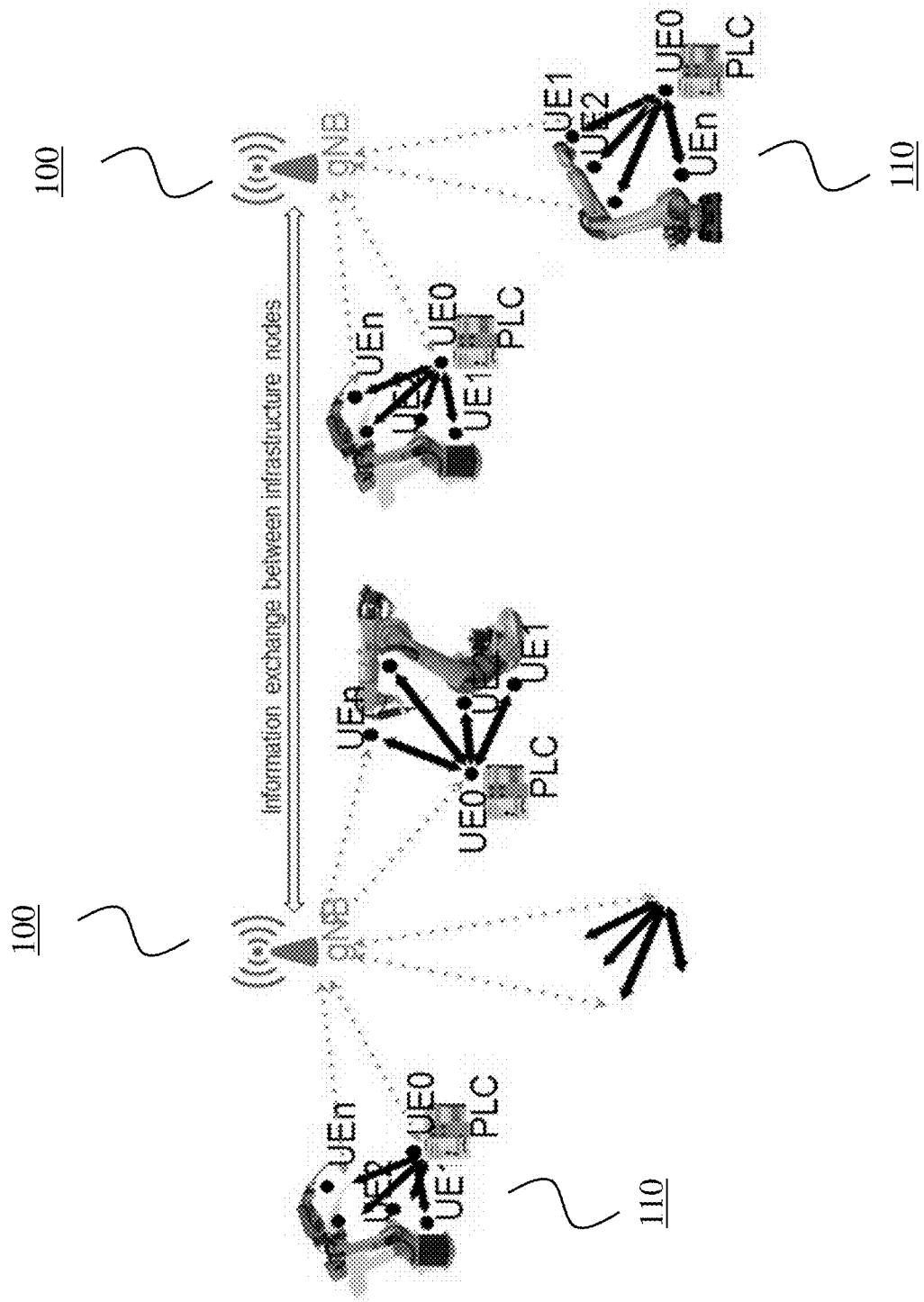
FIG. 7 shows a case of multi-point coordination and pattern alignment implemented by devices according to embodiments of the application.

The scheme described above may also be extended to multi-point coordination and hopping sequence/pattern alignment. In this case, which is exemplarily shown in FIG. 7, hopping sequences/patterns are jointly decided for more than one BS 100. This requires information exchange between the BSs 100 or with a central control unit. Serving UEs 110 from more than one BS 100 offers an additional degree of freedom, which may be used to:

Increase diversity by switching between serving BS 100 of a UE 110.

Coordinate resources (beams/frequency/time) between BSs 100 e.g. to avoid interference Serve UEs 110 simultaneously on different or even the same frequency/time resource (CoMP).

The benefits of exchanging information between coordinated BSs 100, or between each BS 100 and a central unit, include interference mitigation through joint pre-agreement of hopping sequences/patterns, enhancement of spatial diversity and throughput, e.g. through coordinated transmission even on same resources. Depending on the level of coordination and the required information exchange, hopping sequences/patterns can be aligned to:

Avoid assigning beams that would potentially interfere which each other on same frequency.

Avoid using the same time/frequency resources. Serve UEs 110 from more than one BS 100 by either hopping between BS 100, or serve UEs 110 simultaneously by more BSs 100 on different resources and via different beams.

Figure 8:
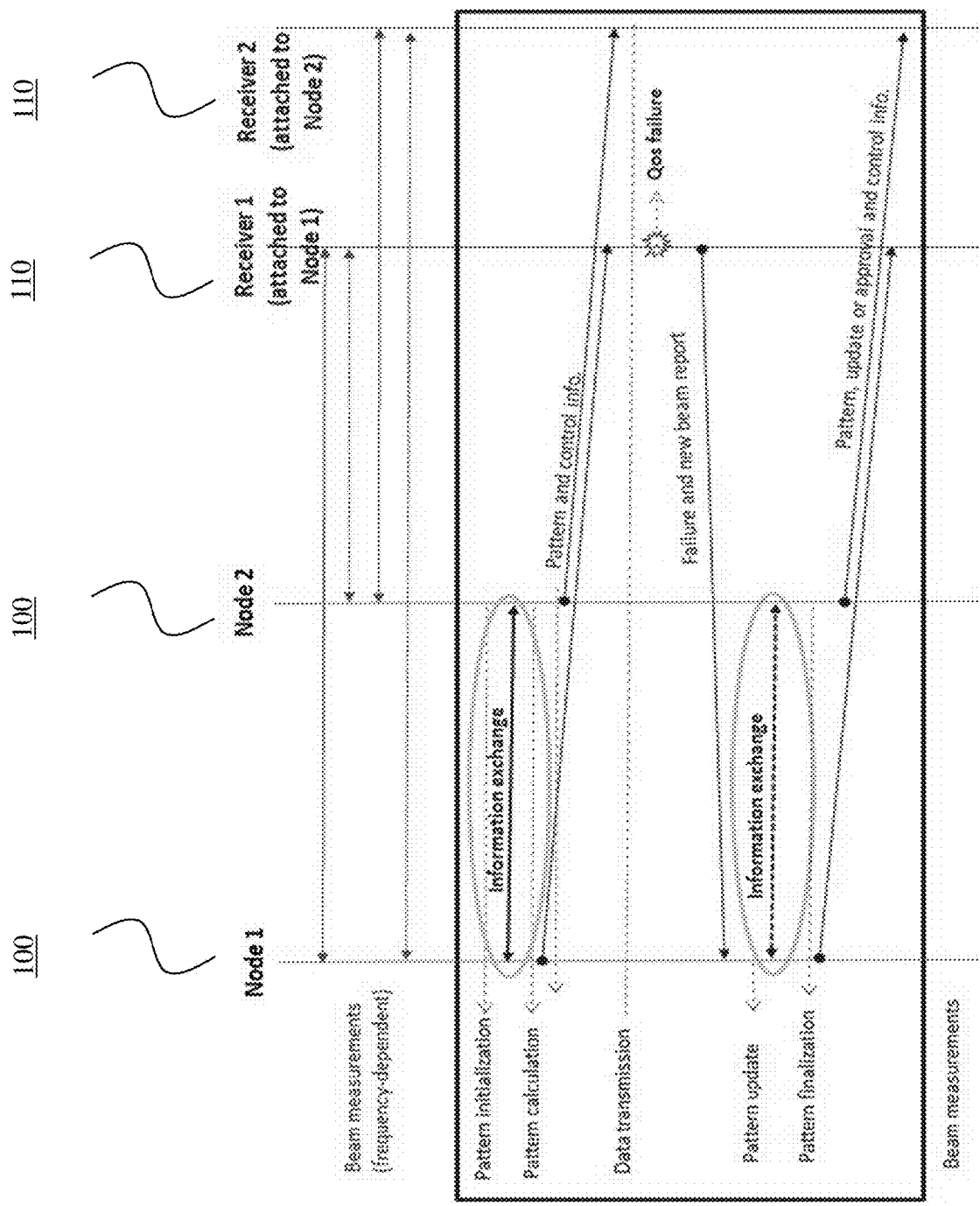
FIG. 8 shows a procedure between network devices (nodes) and wireless communication devices (receivers) according to embodiments of the application suitable for multi-point.

FIG. 8 shows a sequence diagram for an exemplary case of two BSs 100 ("Node 1", "Node 2") and two UEs 110 ("Receiver 1", "Receiver 2") being served. Depending on the architecture type (distributed/centralized), the BSs 100 may exchange information among each other or with a central unit. Then, based on the feedback information and hopping pattern changes, the signaling between BSs 100 and the central controller may need to be updated accordingly.

The procedure and information exchange may include following steps: each BS 100 may collect measurements from its attached UEs 110, and a—potentially—a subset of measurements is shared between BSs 100 and the central unit, e.g. including a coarse preselection of resources and beams to be used. After hopping sequences/patterns are finalized, they are shared from the central unit to the BSs 100 (or among them) and each BS 100 instructs its UEs 110 accordingly.

Figure 9:
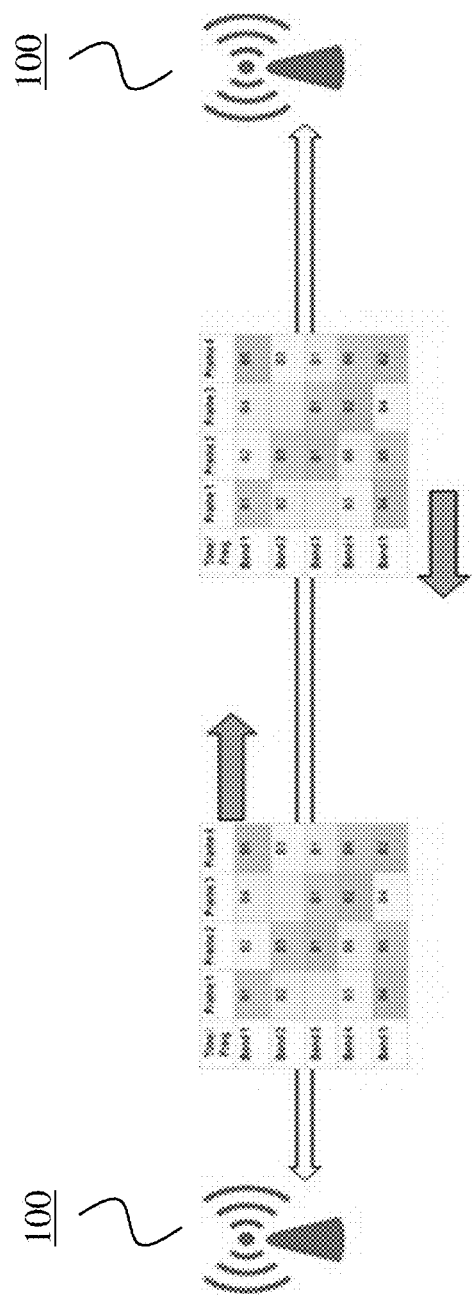
FIG. 9 shows schematically an exchange of update information between network devices according to embodiments of the application.

In case a BS 100 receives a communication failure report from a UE 100, the hopping sequence 102 of the UE 110 may be updated by its serving BS 100. The changes with respect to the initial hopping sequence 102 may be shared with the other BSs 100. In case the other BSs 100—according e.g. to a predefined rule and the available information—update any of their own hopping sequences/patterns, update information is exchanged between all BSs 100. This is schematically shown in FIG. 9.

Figure 10:
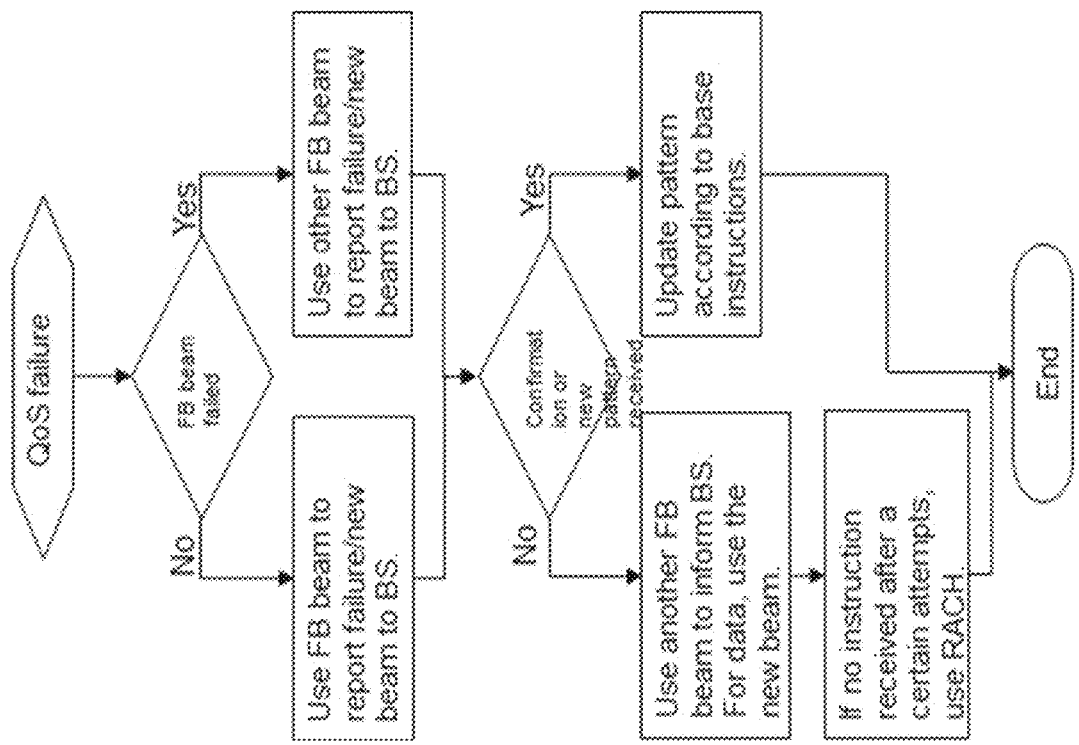
FIG. 10 shows a procedure at a wireless communication device according to an embodiment of the application in case of a QoS failure.

FIG. 10 shows a procedure of a UE 110 in case of a communication failure. In particular, in case of the communication failure, e.g. a QoS failure, in the downlink, the UE 110 may follow the shown procedure, which is aligned with the sequence diagram and the overall procedure. This UE-side procedure relies on own measurements, as well as on the information exchange with the infrastructure.

At first, the UE 110 may be configured to determine whether a beam for providing feedback information failed. If yes, then the UE 110 may use another beam to report the communication failure to the BS 100. If the UE 110 then receives confirmation or a new hopping sequence 102 or hopping pattern, it may updated its hopping sequence 102 or the hopping pattern according to the instructions from the BS 100. If not, then it may use another beam to inform the BS 100 about the failure, and may use the beam for data. If it still does not receive any instructions after a determined number of attempts, it may use a RACH procedure.

Figure 11:
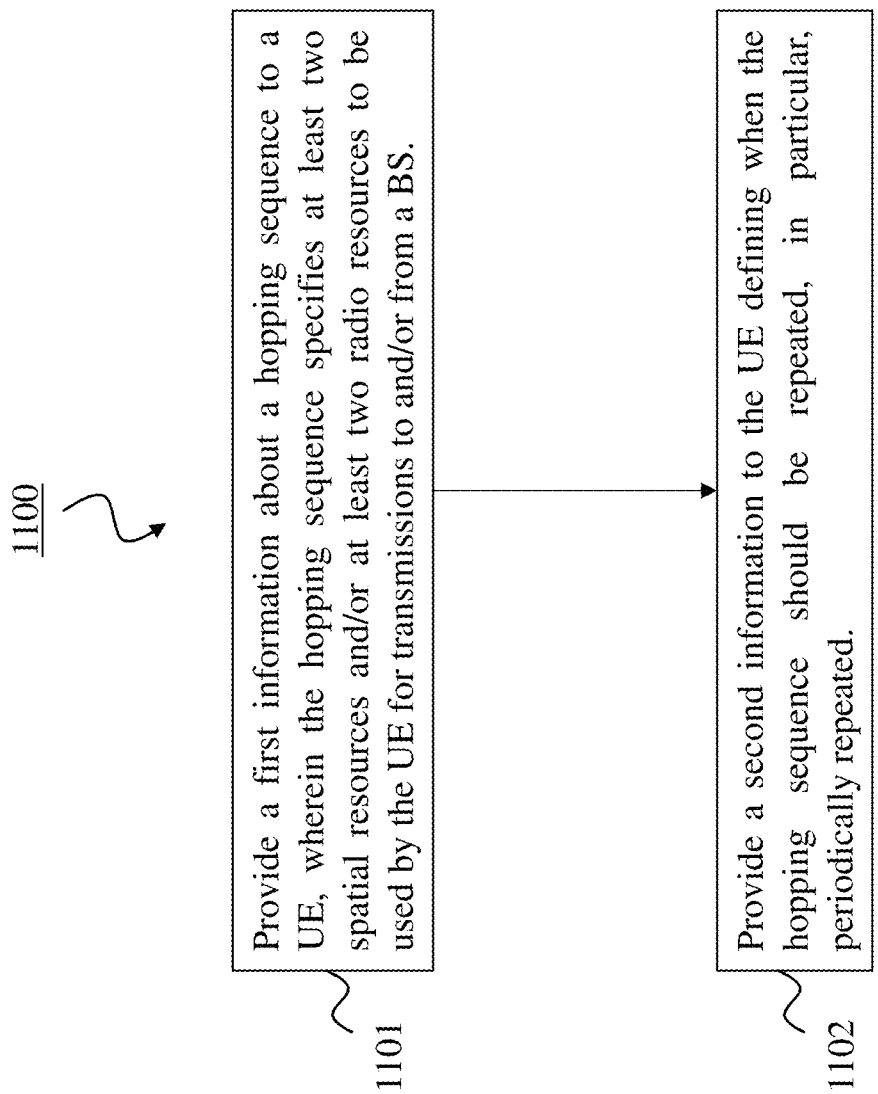
FIG. 11 shows a method according to an embodiment of the application.

FIG. 11 shows a method 1100 according to an embodiment of the application, which may be performed by the BS 100 (as e.g. shown in FIG. 1). The method 1100 includes a step 1101 of providing a first information 101 about a hopping sequence 102 to a UE 100, wherein the hopping sequence 102 specifies at least two spatial resources and/or at least two radio resources to be used by the UE 110 for transmissions 104 to and/or from the BS 100. The method 1100 further includes a step 1102 of providing a second information 103 to the UE 110 defining when the hopping sequence 102 should be repeated, in particular, periodically repeated.

Figure 12:
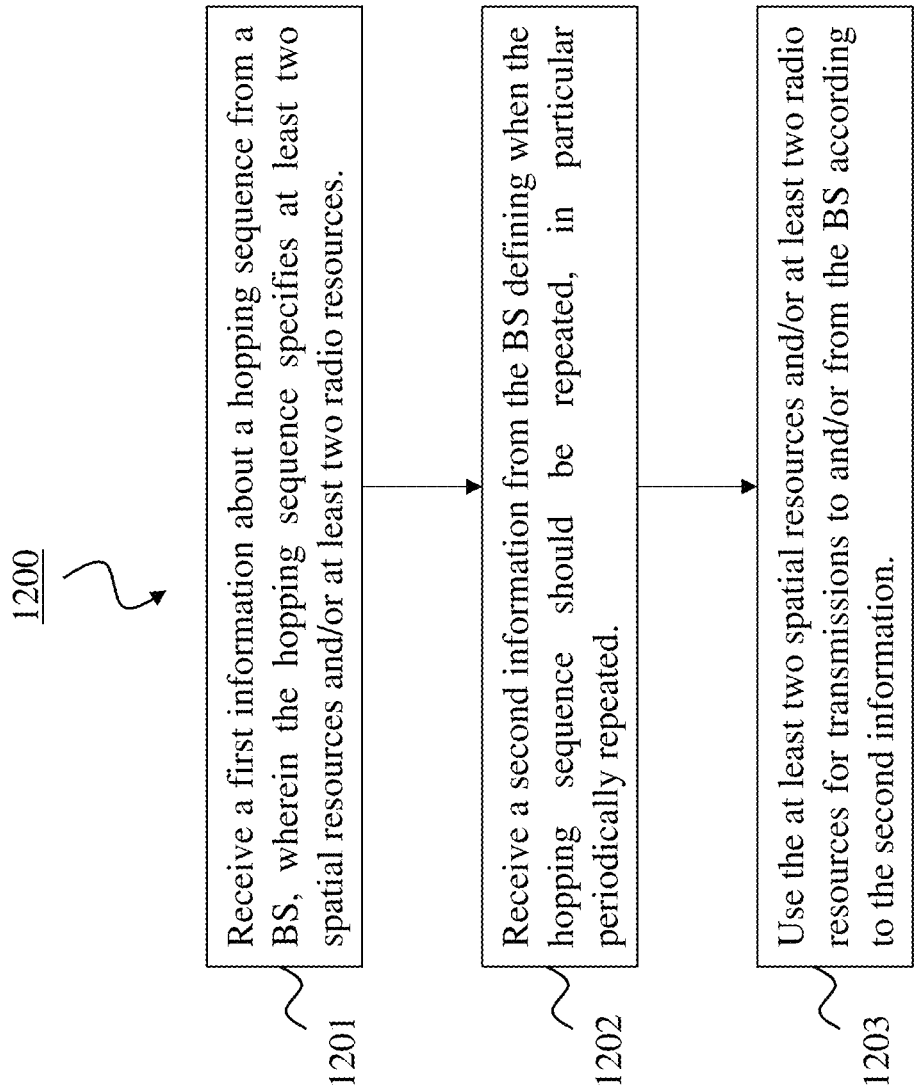
FIG. 12 shows a method according to an embodiment of the application.
Figure 13:
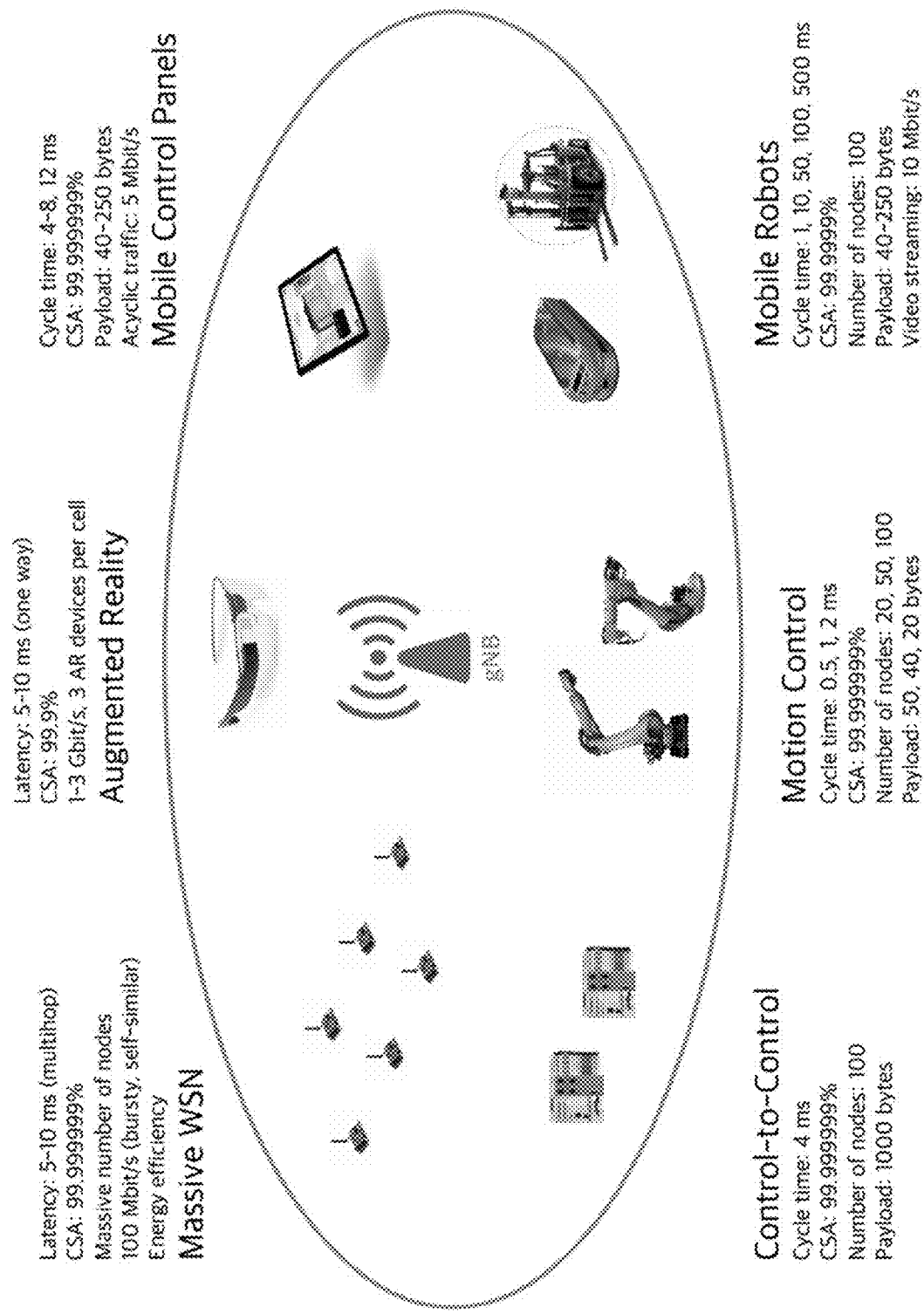
FIG. 13 shows typical scenarios of industrial automation.
Figure 14:
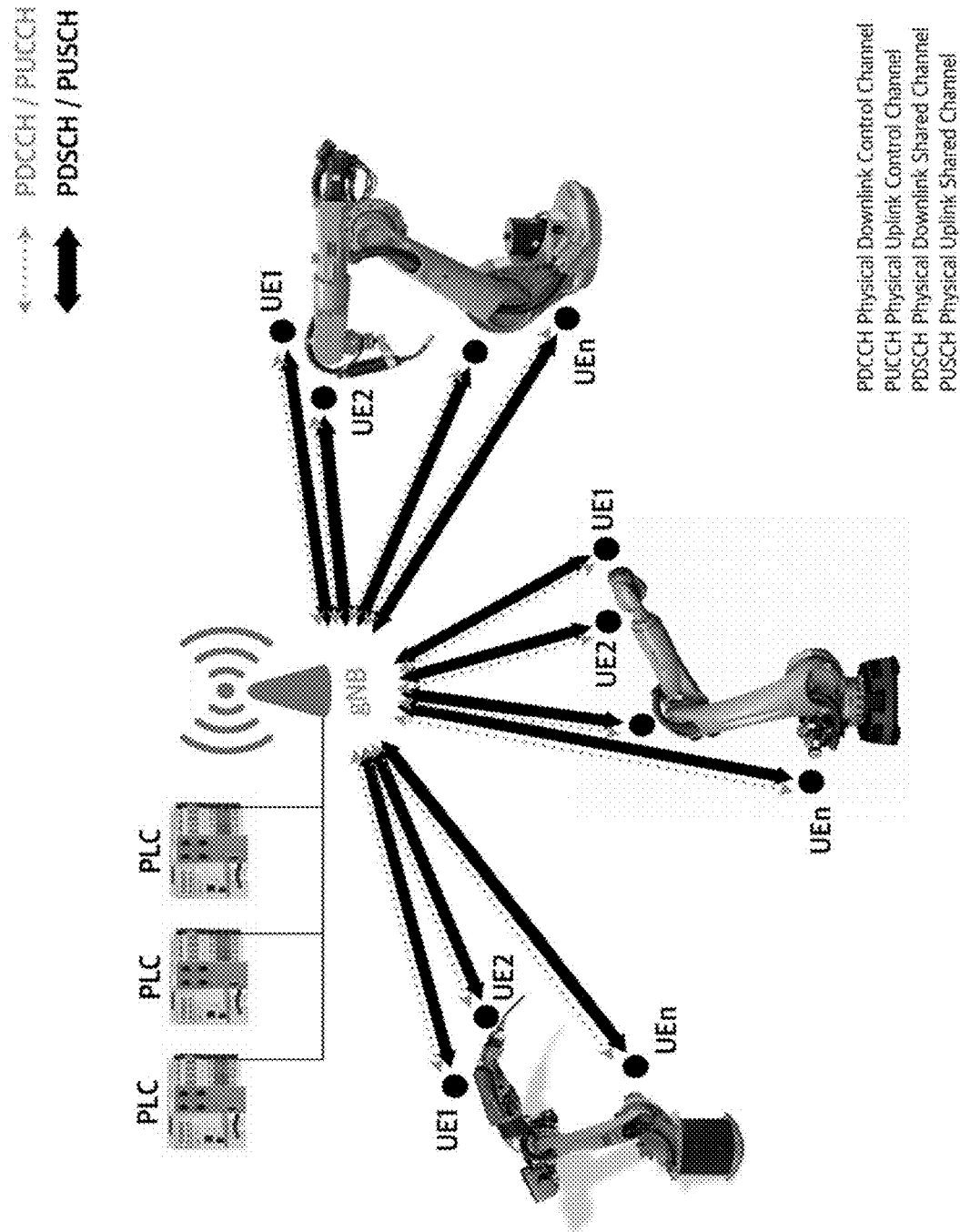
FIG. 14 shows an example of a production unit consisting of an infrastructure point and several users.
Figure 15:
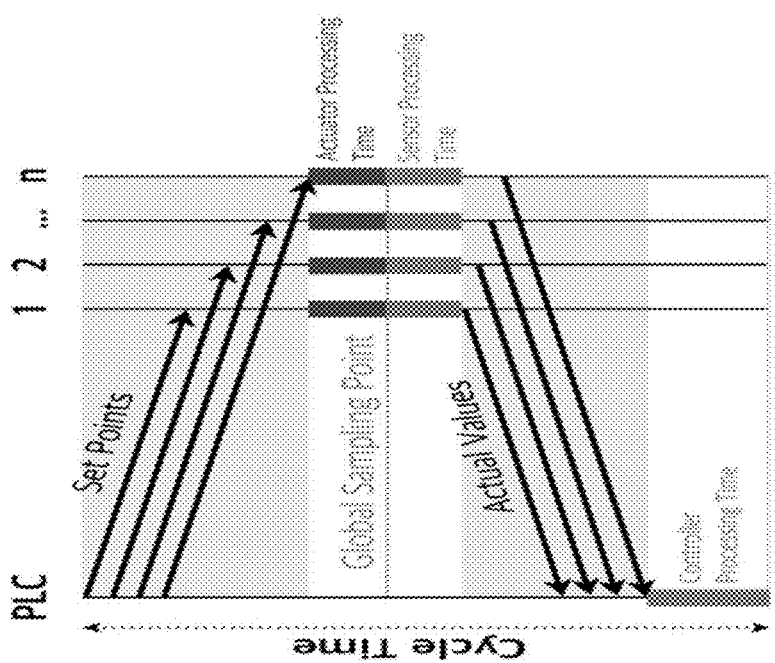
FIG. 15 shows an example of an industrial communication process involving control loops.
Figure 15:
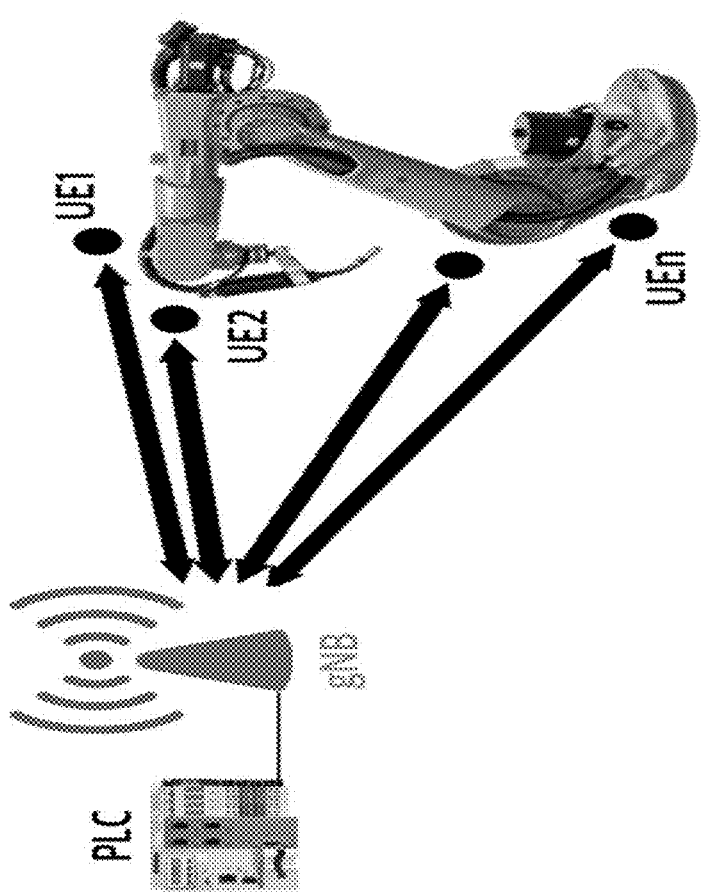
Figure 16:
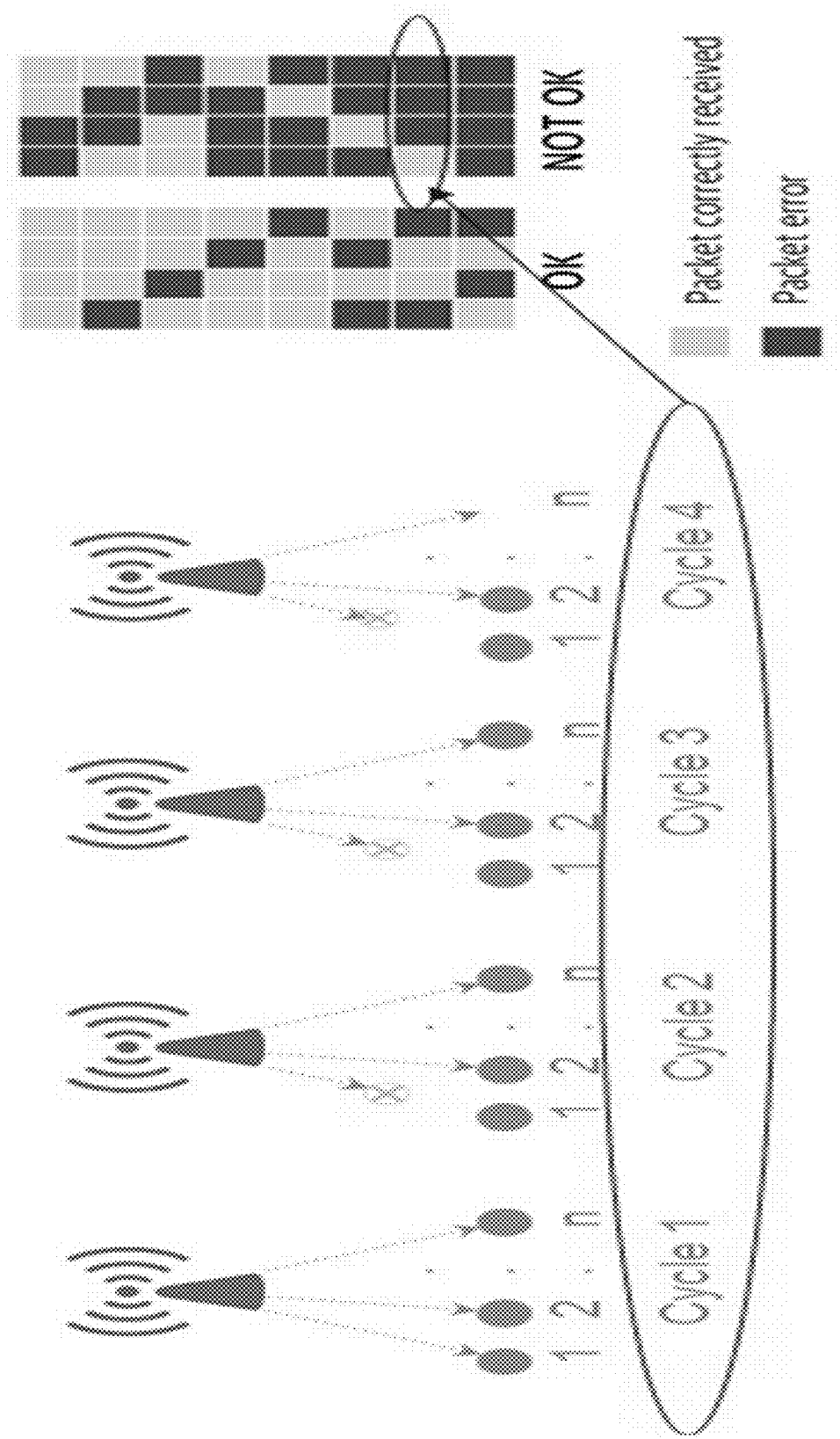
FIG. 16 shows an example of data packet failures in consecutive cycles.

FIG. 12 shows a method 1200 according to an embodiment of the application, which may be performed by the UE 110 (as e.g. shown in FIG. 1). The method 1200 includes a step 1201 of receiving a first information 101 about a hopping sequence 102 from a BS 100, wherein the hopping sequence 102 specifies at least two spatial resources and/or at least two radio resources. Further, the method 1200 includes a step 1202 of receiving a second information 103 from the BS 100 defining when the hopping sequence 102 should be repeated, in particular periodically repeated. Finally, the method 1200 comprises a step 1203 of using the at least two spatial resources and/or at least two radio resources for transmissions 104 to and/or from the BS 100 according to the second information 103.

The present application has been described in conjunction with various embodiments as examples as well as implementations. However, other variations can be understood and effected by those persons skilled in the art and practicing the claimed application, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A network device for cyclic communication, the network device comprising:
   a processor configured to
      provide first information defining a hopping pattern to multiple wireless communication devices, wherein the hopping pattern comprises different hopping sequences, including one hopping sequence for each of the multiple wireless communication devices;
      wherein each hopping sequence specifies at least two spatial resources, or at least two radio resources, or at least two spatial resources and at least two radio resources, to be used by the respective wireless communication devices for transmissions to or from the network device;
      receive a measurement of at least one of a signal strength or a signal-to-interference-plus-noise ratio, SINR, from at least one wireless communication device, Transmission-Reception Point, TRP, or another network device, and calculate the hopping sequence using the received measurement; and
      provide second information to a wireless communication device of the multiple wireless communication devices defining when the hopping sequence should be periodically repeated.

2. The network device according to claim 1, wherein:
   the second information specifies at least one of a period of time and a number of successive transmissions, for which the at least two spatial resources or the at least two radio resources are to be successively used by the wireless communication device.

3. The network device according to claim 1, wherein the processor is further configured to:
   obtain feedback information about a communication failure from the wireless communication device, and
   provide third information about an updated hopping sequence, updated based on the received feedback information, to the wireless communication device.

4. The network device according to claim 3, wherein:
   the second information further specifies at least one of a spatial resource or radio resource to be used by the wireless communication device to provide the feedback information to the network device, and
   the processor of the network device is further configured to obtain the feedback information from the wireless communication device according to at least one of the spatial resource or radio resource specified by the second information.

5. The network device according to claim 2, wherein:
   the second information further includes a maximum number of communication failures, related to at least one of missing packets and QoS failures, for which the hopping sequence of the wireless communication device is valid, or a spatial or radio resource for providing feedback information.

6. The network device according to claim 1, wherein the processor is further configured to:
   provide fourth information related to at least one of the first information or the second information defining a backup hopping sequence to be used by the wireless communication device, as of an occurrence of a communication failure, for transmissions to or from the network device.

7. A method for a network device, the method comprising:
   providing first information defining a hopping pattern to multiple wireless communication devices, wherein the hopping pattern comprises different hopping sequences, including one hopping sequence for each of the multiple wireless communication devices;
   wherein each hopping sequence specifies at least two spatial resources, or at least two radio resources, or at least two spatial resources and at least two radio resources, to be used by the respective wireless communication devices for transmissions to or from the network device;
   receiving a measurement of at least one of a signal strength or a signal-to-interference-plus-noise ratio, SINR, from at least one wireless communication device, Transmission-Reception Point, TRP, or another network device, and calculating the hopping sequence using the received measurement; and
   providing second information to a wireless communication device of the multiple wireless communication devices defining when the hopping sequence should be periodically repeated.

8. The method according to claim 7, wherein:
   the second information specifies at least one of a period of time and a number of successive transmissions, for which the at least two spatial resources, or the at least two radio resources, or the at least two spatial resources and at least two radio resources are to be successively used by the wireless communication device.

9. The method according to claim 8, wherein:
   the second information further includes a maximum number of communication failures, related to at least one of missing packets and QoS failures, for which the hopping sequence of the wireless communication device is valid, or a spatial or radio resource for providing feedback information.

10. The method according to claim 7, further comprising:
    obtaining feedback information about a communication failure from the wireless communication device; and
    providing third information about an updated hopping sequence, updated based on the received feedback information, to the wireless communication device.

11. The method according to claim 10, wherein:
    the second information further specifies at least one of a spatial resource or radio resource to be used by the wireless communication device to provide the feedback information to the network device; and the method further comprises obtaining the feedback information from the wireless communication device according to at least one of the spatial resource or radio resource specified by the second information.

12. The method according to claim 7, further comprising:
providing fourth information related to at least one of the first information or the second information defining a backup hopping sequence to be used by the wireless communication device, as of an occurrence of a communication failure, for transmissions to or from the network device.

* * * * *